US012052551B2

(12) United States Patent
Abel et al.

(10) Patent No.: US 12,052,551 B2
(45) Date of Patent: Jul. 30, 2024

(54) NETWORKED AUDIO AURALIZATION AND FEEDBACK CANCELLATION SYSTEM AND METHOD

(71) Applicants: The Board of Trustees of the Leland Stanford Junior University, Stanford, CA (US); University of Limerick, Limerick (IE)

(72) Inventors: Jonathan S. Abel, Stanford, CA (US); Eoin F. Callery, Stanford, CA (US)

(73) Assignees: The Board of Trustees of the Leland Stanford Junior University, Stanford, CA (US); University of Limerick, Limerick (IE)

( * ) Notice: Subject to any disclaimer, the term of this patent is extended or adjusted under 35 U.S.C. 154(b) by 0 days.

(21) Appl. No.: 18/171,175

(22) Filed: Feb. 17, 2023

(65) Prior Publication Data

US 2023/0209256 A1 Jun. 29, 2023

Related U.S. Application Data

(63) Continuation of application No. 17/074,353, filed on Oct. 19, 2020, now Pat. No. 11,589,159, which is a continuation-in-part of application No. 16/442,386, filed on Jun. 14, 2019, now Pat. No. 10,812,902.

(60) Provisional application No. 63/011,213, filed on Apr. 16, 2020, provisional application No. 62/685,739, filed on Jun. 15, 2018.

(51) Int. Cl.
*H04R 3/02* (2006.01)

(52) U.S. Cl.
CPC .................................... *H04R 3/02* (2013.01)

(58) Field of Classification Search
CPC .... H04R 3/02; H04R 2227/007; H04R 3/005; H04R 27/00; H04S 7/305; H04S 7/307
USPC ................................ 381/56, 83, 93, 94.1, 95
See application file for complete search history.

(56) References Cited

U.S. PATENT DOCUMENTS

| | | | | |
|---|---|---|---|---|
| 10,063,965 | B2 * | 8/2018 | Kim | G01S 5/18 |
| 10,237,649 | B2 | 3/2019 | Nongpiur | |
| 10,283,106 | B1 | 5/2019 | Saeidi et al. | |
| 2014/0003611 | A1 | 1/2014 | Mohammad et al. | |
| 2016/0171964 | A1 * | 6/2016 | Kim | H04R 3/02<br>381/71.11 |

(Continued)

*Primary Examiner* — Yosef K Laekemariam
(74) *Attorney, Agent, or Firm* — Foley & Lardner LLP

(57) ABSTRACT

The present embodiments generally relate to enabling participants in an online gathering with networked audio to use a cancelling auralizer at their respective locations to create a common acoustic space or set of acoustic spaces shared among subgroups of participants. For example, there are a set of network connected nodes, and the nodes can contain speakers and microphones, as well as participants and node mixing-processing blocks. The node mixing-processing blocks generate and manipulate signals for playback over the node loudspeakers and for distribution to and from the network. This processing can include cancellation of loudspeaker signals from the microphone signals and auralization of signals according to control parameters that are developed locally and from the network. A network block can contain network routing and processing functions, including auralization, synthesis, and cancellation of audio signals, synthesis and processing of control parameters, and audio signal and control parameter routing.

15 Claims, 5 Drawing Sheets

(56) References Cited

U.S. PATENT DOCUMENTS

| | | | |
|---|---|---|---|
| 2017/0223478 | A1 | 8/2017 | Jot et al. |
| 2018/0135864 | A1 | 5/2018 | Hanazono et al. |

* cited by examiner

NETWORKED AUDIO AURALIZATION AND FEEDBACK CANCELLATION SYSTEM AND METHOD

CROSS-REFERENCE TO RELATED APPLICATIONS

The present application is a continuation of U.S. patent application Ser. No. 17/074,353 filed Oct. 19, 2020, now U.S. Pat. No. 11,589,159, which application claims priority to U.S. Provisional Patent Application No. 63/011,213 filed Apr. 16, 2020, and which application is a continuation-in-part of U.S. patent application Ser. No. 16/442,386 filed Jun. 14, 2019, now U.S. Pat. No. 10,812,902, which application claims priority to U.S. Provisional Patent Application No. 62/685,739 filed Jun. 15, 2018, the contents of all such applications being incorporated herein by reference in their entirety.

TECHNICAL FIELD

The present embodiments relate generally to the field of audio signal processing, particularly to artificial reverberation and simulating acoustic environments across and between various networked local environments.

BACKGROUND

Acoustics are integral to a space, conveying its size, architecture, materials, even whether it's cluttered or empty. Acoustics also are important in conveying the "feel" of a space. In music performance, the performance space acoustics is vital: Performers adjust their phrasing, tempo, and aspects of pitch according to features of the room reverberation. In video game play, acoustics can be used to indicate the spaces occupied by the players and sound sources.

Among other things, the present Applicant has recognized the consequences of having different acoustics at different locations when participating in network-connected meetings, music recording sessions, live theater performances, gameplay, and the like. Problems that arise in these settings include the lack of a shared acoustic space on a conference call or in live music performance. In video conferences, such as provided by Zoom, the different acoustics of participant spaces emphasizes the physical separation of the participants.

Another difficulty is the need to wear headphones to prevent feedback. Current broadcast and network/internet reverberation systems, e.g., auralization systems, used in gaming, performances, sports broadcasts, or conference scenarios require participants in various locations to wear headphones in order to hear synthetic auralizations that are not the dry acoustic of a room or office. This can restrict the movements of participants and also restrict local communication at any site that has multiple participants. However, the wearing of headphone is often necessary to avoid feedback while maintaining audio quality.

In many scenarios it is desired to have different participants experience somewhat different acoustic settings. For instance in a live music performance, the performers (and audience members close to the stage) would hear a less reverberant sound helpful for hearing each other while performing, whereas those further from the stage will hear a more reverberant sound. As another example, in gameplay, sound sources in different virtual locations benefit from acoustics indicating their virtual surroundings.

Accordingly, among other things, it would be desirable to have a networked audio system that provides for the enjoyment of audio at nodes of the network from a plurality of sound sources, each source that is presented at a given network node having the acoustics desired for that source at that node, and each network node having loudspeakers to render sound.

SUMMARY

The present embodiments generally relate to enabling participants in an online gathering with networked audio to use a cancelling auralizer at their respective locations to create a common acoustic space or set of acoustic spaces shared among subgroups of participants. For example, there are a set of network connected nodes, and the nodes can contain speakers and microphones, as well as participants and node mixing-processing blocks. The node mixing-processing blocks generate and manipulate signals for playback over the node loudspeakers and for distribution to and from the network. This processing can include cancellation of loudspeaker signals from the microphone signals and auralization of signals according to control parameters that are developed locally and from the network. A network block can contain network routing and processing functions, including auralization, synthesis, and cancellation of audio signals, synthesis and processing of control parameters, and audio signal and control parameter routing.

According to certain aspects, the loudspeaker signal, which can contain the acoustic cues to enhance the acoustics of sounds at that node, as well as sound from other networked sources, is cancelled from the microphone signal before being processed and being sent to the network for distribution. This approach has application both for online meetings and distributed performances, and allows each participant to experience and control their own acoustics

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments are directed to a network distribution system for sound and video in which some or all local sites can be equipped with a cancelling auralizer such as that described in U.S. application Ser. No. 16/442,386 ("the '386 application"), and with all sites being connected via a network. In these and other embodiments, the network is capable of further processing and cancelling room and/or synthetic auralization sound at one local site as it is distributed to one or more of the other local sites. The network can render and adjust the auralization and the parameters of the auralizations at any local site independently or globally.

In some embodiments, some or all local sites can also control the rendering of synthetic auralizations and the auralization parameters if needed locally. Local sites can apply other forms of crosstalk or other cancellation to create the desired wet/dry auralization signal that is sent to other local sites. This allows for the rendering of an appropriate synthetic auralization for each participant in each use case.

Figure 1:
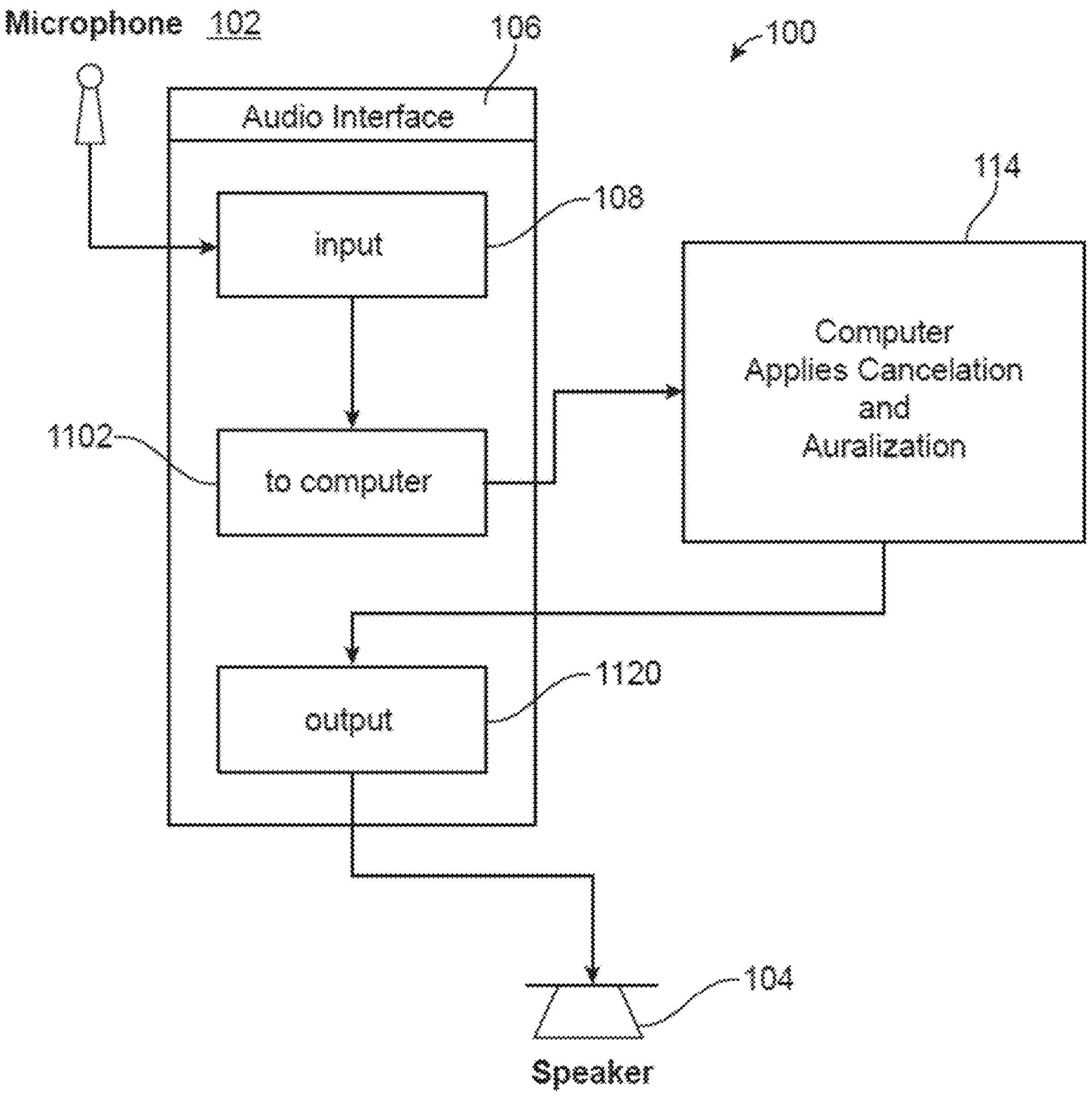
FIG. 1 is a block diagram illustrating an example node according to embodiments.

FIG. 1 is a block diagram illustrating an example node having a cancelling auralizer according to embodiments.

As shown, example node 100 includes a microphone 102 and speaker 104 that are both connected to an audio interface 106. Audio interface 106 includes an input 108 connected to microphone 102 and an output 110 connected to speaker 104. Audio interface 106 further includes a port 112 connected to computer 114 (e.g. desktop or notebook computer, pad or tablet computer, smart phone, etc.). It should be noted that other embodiments of system 100 can include additional or fewer components than shown in the example of FIG. 1. For example, although FIG. 1 illustrates an example with one microphone 102 and one speaker 104, it should be apparent that there can by two or more microphones 102 and/or two or more speakers 104.

Moreover, although shown separately for ease of illustration, it should be noted that certain components of node 100 can be implemented together. For example, computer 114 can comprise digital audio workstation software (e.g. implementing auralization and cancelation processing according to embodiments) and be configured with an audio interface such as 106 connected to microphone preamps (e.g. input 108) and microphones (e.g. microphone 102) and a set of powered loudspeakers (e.g. speaker 104). In these and other embodiments, certain components can also be integrated into existing speaker arrays, and can be implemented using inexpensive and readily available software. For example, in virtual, augmented, and mixed reality scenarios, the system allows users to dispense with headphones for more immersive virtual acoustic experiences. Other hardware and software, including special-purpose hardware and custom software, may also be designed and used in accordance with the principles of the present embodiments.

In general operation according to aspects of embodiments, room sounds (e.g. a music performance, voices from a virtual reality game participant, etc.) are captured by microphone 102. The captured sounds (i.e. microphone signals) are provided via interface 106 to computer 114, which processes the signals in real time to perform artificial reverberation according to the acoustics of a desired target space (i.e. auralization). The processed sound signals are then presented via interface 106 over speaker 104, thereby augmenting the acoustics of the room and enriching the experience of performers, game players, etc. As should be apparent, the room microphone 102 will also capture sound from the speaker 104, which is playing the simulated acoustics. According to aspects of the present embodiments, and as will be described in more detail below, computer 114 further estimates and subtracts the simulated acoustics in real time from the microphone signal, thereby eliminating feedback.

Figure 2:
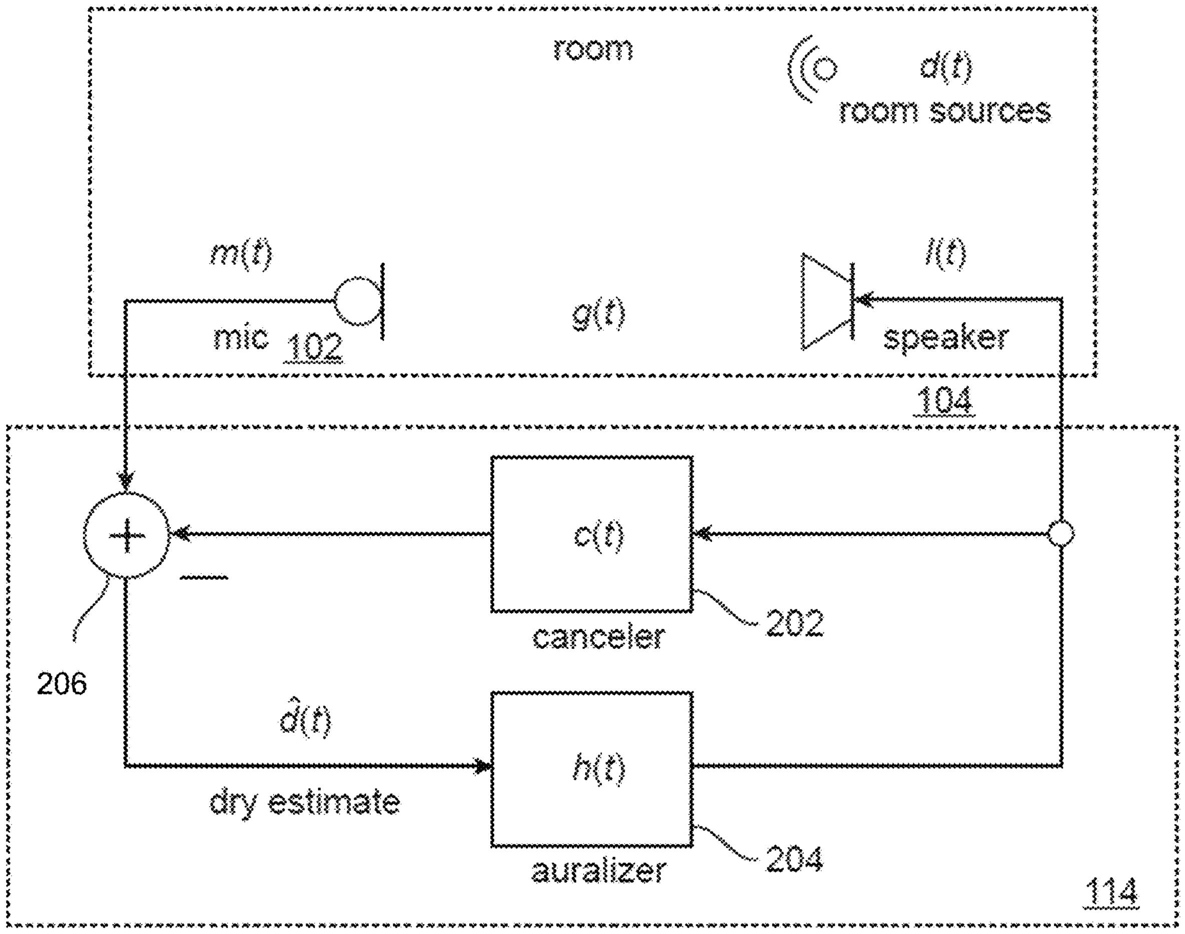
FIG. 2 is a signal flow diagram illustrating an example feedback canceling auralization processing according to embodiments.

FIG. 2 is a signal flow diagram illustrating processing performed by node 100 (e.g. computer 114) according to an example embodiment. As shown in FIG. 2, example computer 114 in embodiments includes a canceler 202 and an auralizer 204. In operation of node 100, a room microphone 102 captures contributions from room sound sources d(t) and synthetic acoustics produced by the loudspeaker 104 according to its applied signal l(t), t denoting time. Auralizer 204 imparts the sonic characteristic of a target space, embodied by the impulse response h(t), on the room sounds d(t) through convolution, $$l(t)=h(t)*d(t). \tag{1}$$

Many known auralization techniques can be used to implement auralizer 204, such as those using fast, low-latency convolution methods to save computation (e.g., William G. Gardner, "Efficient convolution without latency," Journal of the Audio Engineering Society, vol. 43, pp. 2, 1993; Guillermo Garcia, "Optimal filter partition for efficient convolution with short in-put/output delay," in Proceedings of the 113th Audio Engineering Society Convention, 2002; and Frank Wefers and Michael Vorlander, "Optimal filter partitions for real-time fir filtering using uniformly-partitioned fft-based convolution in the frequency-domain," in Proceedings of the 14th International Conference on Digital Audio Effects, 2011, pp. 155-61). Another "modal reverberator" approach is disclosed in U.S. Pat. No. 9,805,704, the contents of which are incorporated herein by reference in their entirety. Although these known techniques can provide a form of impulse response h(t) used by auralizer 204, the difficulty is that the room source signals d(t) are not directly available: As described above, the room microphones also pick up the synthesized acoustics, and would cause feedback if the room microphone signal m(t) were reverberated without additional processing.

According to certain aspects, the present embodiments auralize (e.g. using known techniques such as those mentioned above) an estimate of the room source signals d^(t), formed by subtracting from the microphone signal m(t) an estimate of the synthesized acoustics (e.g. the output of speaker 104). Assuming the geometry between the loudspeaker and microphone is unchanging, the actual "dry" signal d(t) is determined by:

$$d(t)=m(t)-g(t)*l(t), \quad (2)$$

where g(t) is the impulse response between the loudspeaker and microphone. Embodiments design an impulse response c(t), which approximates the loudspeaker-microphone response, and use it to form an estimate of the "dry" signal, $\hat{d}(t)$, which is determined by:

$$\hat{d}(t)=m(t)-c(t)*l(t). \quad (3)$$

as shown in the signal flow diagram FIG. 2. The synthetic acoustics are canceled from the microphone signal m(t) by canceler 202 and subtractor 206 to estimate the room signal $\hat{d}(t)$, which signal is reverberated by auralizer 204.

The question then becomes how to obtain the canceling filter c(t). A measurement of the impulse response g(t) provides an excellent starting point, though there are time-frequency regions over which the response is not well known due to measurement noise (typically affecting the low frequencies), or changes over time due to air circulation or performers, participants, or audience members moving about the space (typically affecting the latter part of the impulse response). In regions where the impulse response is not well known, it is preferred that the cancellation be reduced so as to not introduce additional reverberation.

Here, the cancellation filter 202 impulse response c(t) is preferably chosen to minimize the expected energy in the difference between the actual and estimated room microphone loud-speaker signals. For simplicity of presentation and without loss of generality, assume for the moment that the loudspeaker-microphone impulse response is a unit pulse, i.e.

$$g(t)=g\delta(t), \quad (4)$$

and that the impulse response measurement $\tilde{g}(t)$ is equal to the sum of the actual impulse response and zero-mean noise with variance $\sigma g^2$. Consider a canceling filter c(t) which is a windowed version of the measured impulse response $\tilde{g}(t)$, $$c(t)=w\tilde{g}\delta(t), \quad (5)$$

In this case, the measured impulse response is scaled according to a one-sample-long window w. The expected energy in the difference between the auralization and cancellation signals at time t is $$E[(gl(t)-w\tilde{g}l(t))^2]=l^2(t)[w^2\sigma g^2+g^2(l-w)^2]. \quad (6)$$

Minimizing the residual energy over choices of the window w yields $$c^*(t)=w^*\tilde{g}\delta(t),\ w^*=g^2/(g^2+\sigma g^2)$$

In other words, the optimum canceler response c*(t) is a Wiener-like weighting of the measured impulse response, $w^*\tilde{g}\delta(t)$. When the loudspeaker-microphone impulse response magnitude is large compared with the impulse response measurement uncertainty, the window w will be near 1, and the cancellation filter will approximate the measured impulse response. By contrast, when the impulse response is poorly known, the window w will be small—roughly the measured impulse response signal-to-noise ratio—and the cancellation filter will be attenuated compared to the measured impulse response. In this way, the optimal cancellation filter impulse response is seen to be the measured loudspeaker-microphone impulse response, scaled by a compressed signal-to-noise ratio (CSNR).

Typically, the loudspeaker-microphone impulse response g(t) will last hundreds of milliseconds, and the window will preferably be a function of time t and frequency f that scales the measured impulse response. Denote by $\tilde{g}(t, fb)$, b=1, 2, . . . N the measured impulse response $\tilde{g}(t)$ split into a set of N frequency bands fb, for example using a filterbank, such that the sum of the band responses is the original measurement, $$\tilde{g}(t)=\mathrm{Sum}(\tilde{g}(t, fb)),\ b=1 \text{ to } N. \quad (8)$$

In this case, the canceler response c*(t) is the sum of measured impulse response bands $\tilde{g}(t, fb)$, scaled in each band by a corresponding window w*(t, fb). Expressed mathematically, $$c^*(t)=\mathrm{Sum}(c^*(t, fb)),\ b=1 \text{ to } N, \quad (9)$$

where $$c^*(t, fb)=w^*(t, fb)\ \tilde{g}(t, fb), \quad (10)$$

$$w^*(t, fb)=g^2(t, fb)/(g^2(t, fb)+\sigma g^2(t, fb)) \quad (11)$$

Embodiments use the measured impulse $\tilde{g}(t, fb)$ as a stand-in for the actual impulse g(t, fb) in computing the window w(t, fb). Alternatively, repeated measurements of the impulse response g(t, fb) could be made, with the measurement mean used for g(t, fb), and the variation in the impulse response measurements as a function of time and frequency used to form $\sigma g^2(t, fb)$. Embodiments also perform smoothing of $g^2(t, fb)$ over time and frequency in computing w(t, fb) so that the window is a smoothly changing function of time and frequency.

Figure 3:
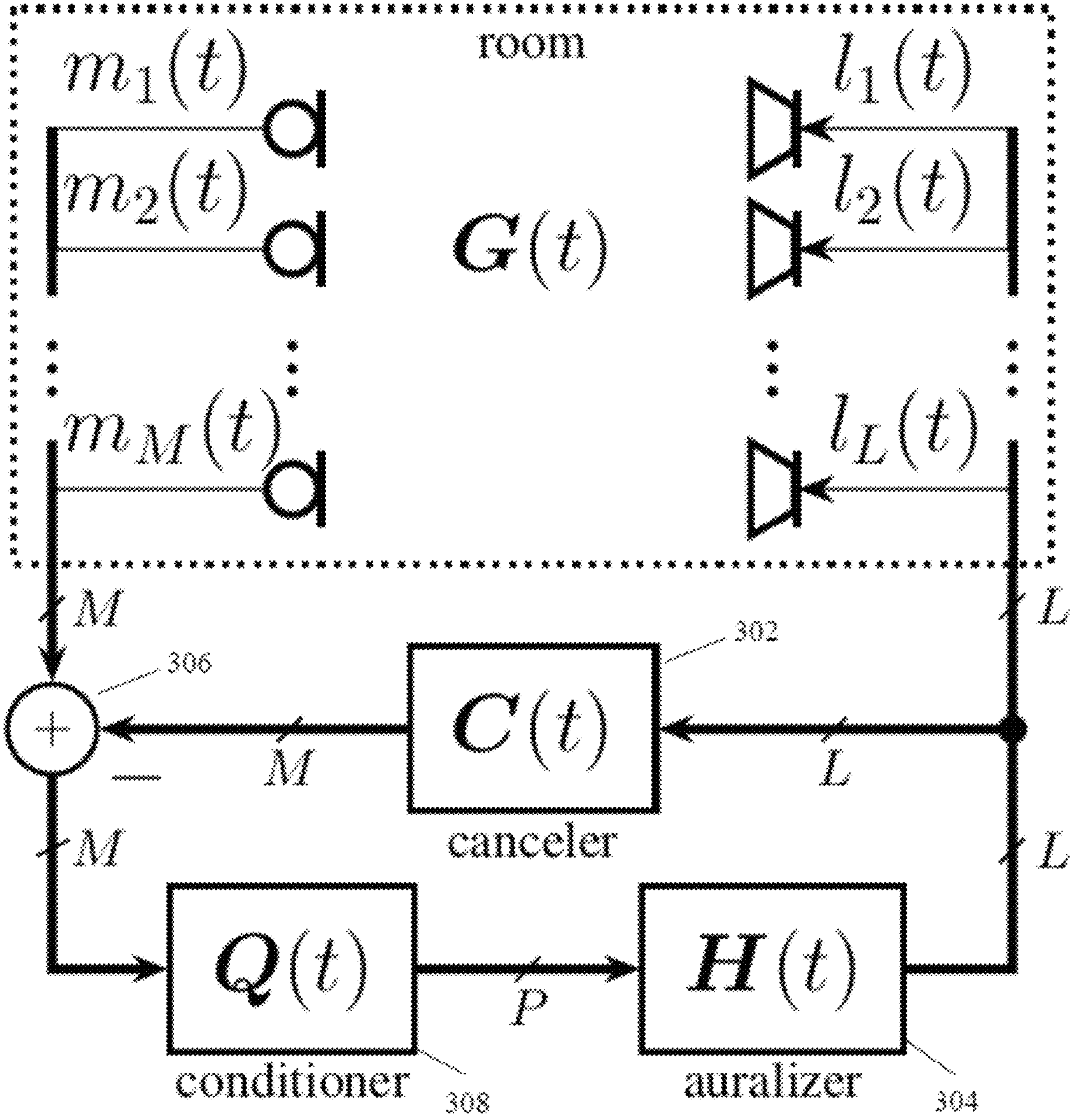
FIG. 3 is a signal flow diagram illustrating another example feedback canceling auralization processing according to embodiments.

It should be noted that the principles described above can be extended to cases other than a single microphone-loudspeaker pair, as shown in FIG. 3. Referring to FIG. 3, in the presence of L loudspeakers and M microphones, a matrix of loudspeaker-microphone impulse responses is measured, and used in subtracting auralization signal estimates from the microphone signals. Stacking the microphone signals into an M-tall column m(t), and the loudspeaker signals into an L-tall column l(t), the cancellation system becomes $$l(t)=H(t)*m(t), \quad (12)$$

$$\hat{d}(t)=m(t)-C(t)*l(t), \quad (13)$$

where H(t) is the matrix of auralizer filters of 304 and C(t) the matrix of canceling filters of 302. As in the single speaker-single microphone case, the canceling filter matrix is the matrix of measured impulse responses, each windowed according to its respective CSNR, which may be a function of both time and frequency.

Moreover, a conditioning processor 308, denoted by Q, can be inserted between the microphones and auralizers, $$l(t)=H(t)*Q(m(t)), \quad (14)$$

$$\hat{d}(t)=Q(m(t))-C(t)*l(t), \quad (15)$$

as seen in FIG. 3. This processor 308 could serve a number of functions. In one example Q could act as the weights of a mixing matrix to determine how the microphones signals are mapped to the auralizers, and subsequently, the loudspeakers. For example, it might be beneficial for microphones that are on one side send the majority of their energy to loudspeakers on the same side of the room, as could be achieved using a B-format microphone array and Ambisonics processing driving the loudspeaker array. Another use could be for when the speaker array and auralizers are used to create different acoustics in different parts of the room. The processor Q could also be a beam former or other microphone array processor to auralize different sounds differently according to their source position. Additionally, this mechanism allows the acoustic to be changed from one virtual space to another in real time, both instantaneously or gradually.

Figure 4:
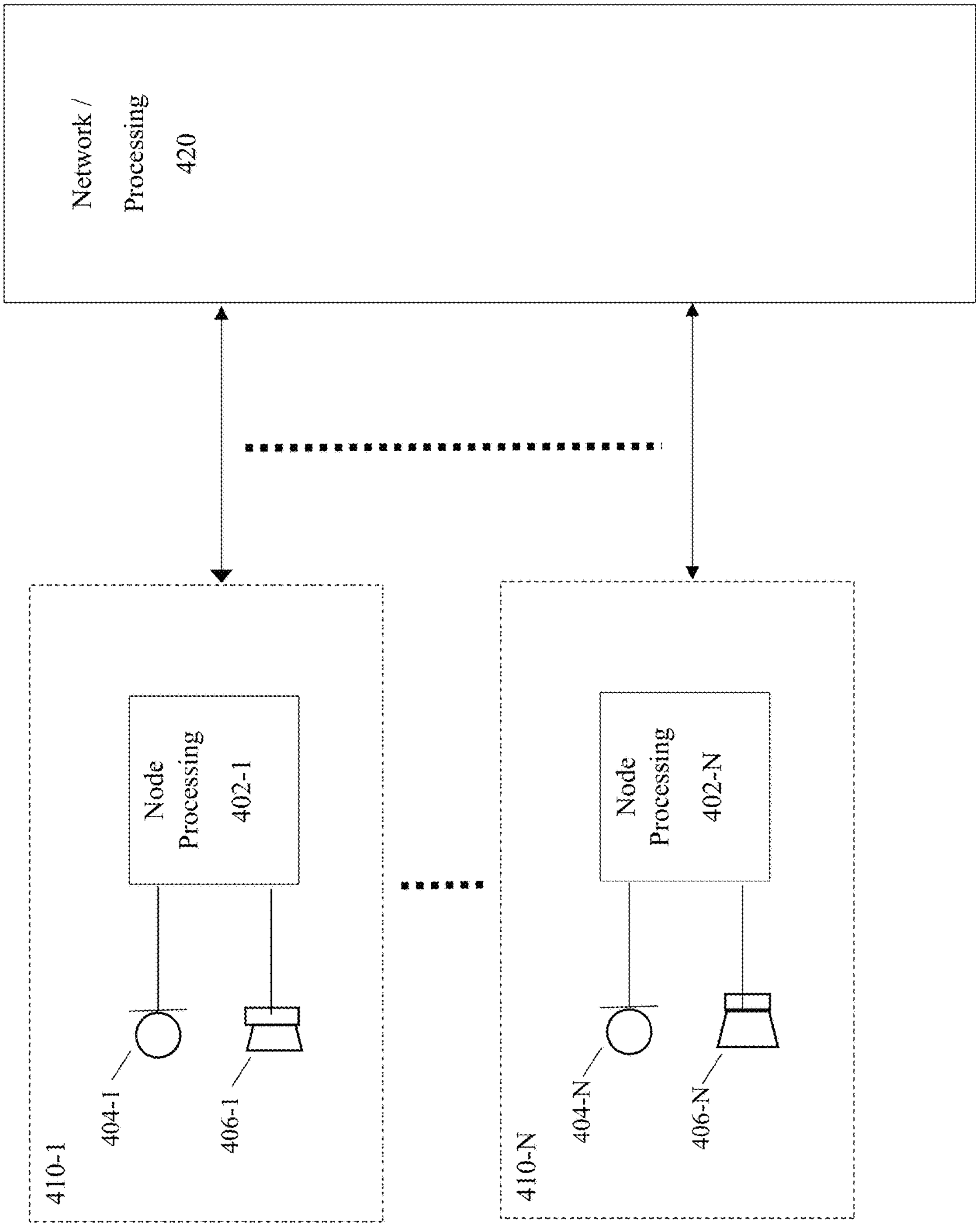
FIG. 4 is a diagram of a networked system including a canceling reverberator according to embodiments.

FIG. 4 is a block diagram illustrating an example system 400 implementing a networked auralizer according to embodiments.

As shown in FIG. 4, system 400 includes a plurality of nodes 410 connected to a network 420. The nodes 410 can each include one or both of a microphone 404 and speaker 406 and a processor (e.g. computer) configured to perform node processing 402. The node processing 402 can include a cancelling auralizer such as that described above and in the '386 application. It should be noted that the processor can further include additional functionality for interfacing with a participant associated with node 410, such as to perform network related interactions as will become more apparent below. The processor can further include functionality for interfacing with network 420, which can include public and/or private networks such as the Internet.

For example, the present Applicant recognizes that in conference calls, network performances, networking gaming, sports broadcasts, simulations, and other VR/AR/MR situations, participants desire the ability to hear individual auralizations that reflect their viewing/participation position in relation to the scenario at hand, and/or the viewing/participation position of other users and these other users' scenarios. Thus this system is capable of rendering/generating and changing the acoustic environment—that is, an auralization—in real time for all participants whether they are performers or spectators, both locally or globally over a network. Examples of such situations include but are not limited to: 1) Network gaming scenarios; 2) A broadcast or internet based network audio/dramatic performance; 3) Multiple musicians/actors performing as a single ensemble at multiple remote local sites; and 4) Video conference meetings.

It should be noted that the cancelling auralizer functionality of the '386 application can be implemented in various ways in system 400 of FIG. 1. In one example, and as described above, the cancelling auralizer functionality can be implemented by node processing 402 in each of one or more of the local nodes 410. In other examples, some or all of the cancelling auralizer functionality can be implemented by network processing in block 420. Those skilled in the art will understand various alternatives in accordance with these and other examples after being taught by the '386 application and the present disclosure.

For example, in one example scenario, participants or spectators of network games at local sites 410 can locally change their own auralization and/or choose which other site's auralization they can listen to. Globally, the system 420 is capable of changing all auralizations and auralization parameters and states for any or all users to fit and reflect the gameplay situation.

In a second example scenario, listeners to a broadcast or internet-based network performances can locally adjust the balance between the direct dry sound of the performers and the synthetic auralizations that accompany the performance and/or change the synthetic auralization in which they are hearing the sound via their own processors 402. The system 420 can further be capable of globally adjusting the auralizations and parameters of these same auralizations for all listeners at all local sites.

In a third example scenario, within an ensemble made up of remote performers, the system allows each performer the ability to change the synthetic auralization or the parameters of their auralization locally via their own processors 402, for example, changing the balance between their dry sound and the wet sound of the locally audible auralization, to suit their role within the ensemble (a conductor may prefer a drier or wetter sound depending on the circumstances). The system 420 can also change the auralization or parameters of the auralization globally for any or all remote local sites of the ensemble and audience.

In these and other scenarios, the system can tailor rendering of all auralizations into monoaural, stereophonic, multichannel, surround, or binaural listening, as suited to the local conditions and performance scenario. The system can render auralizations throughout an inter/intra network consisting of any number of remote/local sites/locations in domestic dwellings, offices, conference rooms, mobile listening scenarios, or other typical listening situation.

In a fourth networked meeting scenario example, it may be useful to create a sense of togetherness or group identification by assigning to subgroups or the entire meeting a set of or a single acoustic signature. As above, this may be accomplished both locally and/or across the network.

Figure 5:
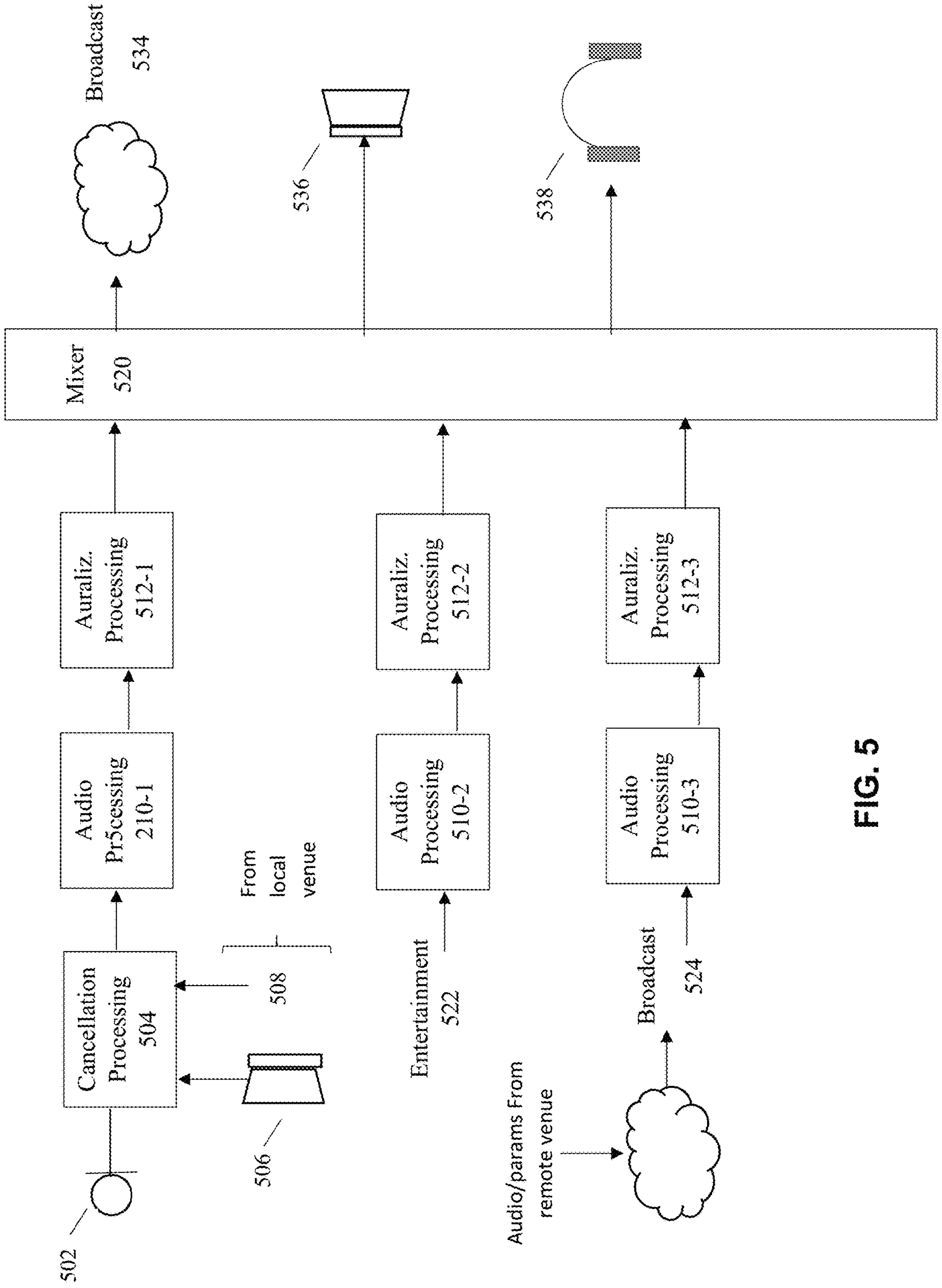
FIG. 5 is a signal flow diagram illustrating aspects of a network based canceling auralization system according to embodiments.

FIG. 5 is a functional block diagram illustrating the above and other aspects of integrating a canceling auralizer into a network-based audio distribution system according to embodiments in alternative detail. In general, FIG. 5 illustrates several different input and output chains, any one or more of which may be combined via mixer 520 depending on a particular use case. These use cases may include, for example, networked entertainment (sports, film, live performance) with shared applause, etc., networked video game play with users in different acoustic spaces but sharing a common acoustic environment (e.g. multiple spectators for a common event), networked music performances, rehearsals and practices, etc.

As shown, in one input example, sound (e.g. voice of a participant, perhaps in addition to other sources) in a first local venue (e.g. room, theater, etc.) may be captured by one or microphones 202. This captured audio may be provided to cancellation processing 504 which may perform reverb and other local cancellation (e.g. cancellation of audio from a local speaker 506) in accordance with local cancellation parameters 508. This results in a "dry" signal (e.g. "dry" voice of the participant) which is fed to audio processing block 510-1, which can perform local audio processing such as DRC, equalization, etc. The processed local audio signal can then be provided to local auralization processing 512-1, which can impart auralization effects on the dry local processed audio signal from block 510-1. Note that the audio processing and auralization processing can be done in any order or combined, as desired. Also note that our use of the term auralization in this specification includes spatialization.

In another input example, audio input 522 in one local site is received. This input audio 522 can include audio from a film, game, soundtrack and other recorded audio, which may or may not be combined with other audio such as close microphone signals, voiceover and sound effects. This results in a signal which is fed to audio processing block 510-2, which can perform local audio processing such as DRC, equalization, etc. The processed local audio signal can then be provided to local auralization processing 512-2, which can impart auralization effects on the local processed audio signal from block 510-2.

In another input example, audio input 524 in one local site is received from another local site or venue via a network. This input audio 524 can include audio as well as other parameters for further audio processing such as spatialization and other parameters. This results in a signal which is fed to audio processing block 510-3, which can perform local audio processing such as DRC, equalization, etc. perhaps in accordance with the received parameters. The processed local audio signal can then be provided to local auralization processing 512-3, which can impart auralization effects on the local processed audio signal from block 510-3, perhaps in accordance with received parameters.

As further shown in FIG. 5, there are various output examples. For example, the processed audio from one local site (e.g. from any of blocks 512-1, 512-2 or 512-3) may be broadcast on a network to other sites and/or participants (e.g. via speakers 536 and/or headphones 538). In another example, the processed audio may be played back locally to one or more participants at the same site via a speaker 536 or via headphones 538.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A system for reducing feedback resulting from a sound produced by a speaker being captured by a microphone that produces a microphone signal, the sound including a first audio track for a performer or listener, the system comprising:

a source processor for producing the first audio track in a first acoustic space;

a canceler, wherein the canceler includes a cancellation filter that is based on an impulse response between the microphone and the speaker, wherein the impulse response is formed according to acoustics of the first acoustic space in which the microphone and the speaker are separately placed, and wherein a dry signal is obtained from the microphone signal; and a post production application for creating a second audio track using the dry signal.

2. The system of claim 1, wherein:

the first audio track includes auralization effects in the first acoustic space;

the source processor includes an auralizer for producing the auralization effects; and the post production application includes applying the dry signal to a second acoustic space.

3. The system of claim 1, wherein the first audio track includes one or more of off- camera dialog, sound effects and cues.

4. The system of claim 1, wherein the first audio track includes one or both of a backing track and a synchronization signal.

5. The system of claim 1, wherein cancellation filter is calibrated based on relative positions of the microphone and the speaker in the first acoustic space.

6. The system of claim 1, wherein the microphone is one of a plurality of microphones, and wherein the speaker is one of a plurality of speakers, and wherein the cancellation filter is based on impulse responses between each microphone-speaker pair of the plurality of microphones and the plurality of speakers.

7. The system of claim 2, wherein the auralization effects include artificial reverberation.

8. The system of claim 7, wherein the artificial reverberation is performed in accordance with a desired acoustic space that is different from the first acoustic space.

9. The system of claim 2, wherein the first acoustic space comprises a sound stage.

10. The system of claim 2, wherein the first acoustic space comprises a green screen.

11. The system of claim 2, wherein the first acoustic space comprises an in-camera visual effects (ICVFX) sound stage.

12. The system of claim 3, wherein the first acoustic space comprises a plurality of speakers including the speaker, further comprising a rendering process to enable a plurality of audio channels to be rendered by the plurality of speakers, and wherein the canceler performs channel-to-microphone cancellation.

13. The system of claim 12, wherein the a number of the plurality of speakers and a number of the plurality of audio channels are the same number.

14. The system of claim 1, further comprising an application for room equalization and auralization equalization based on calibration measurements, including providing room equalization filters or an auralization equalization according to calibration or room measurements.

15. The system of claim 2, further comprising an application for performing live auralization-spatialization using a speaker array spatialization system.

* * * * *